United States Patent
Ciuc et al.

(10) Patent No.: US 7,336,821 B2
(45) Date of Patent: Feb. 26, 2008

(54) AUTOMATIC DETECTION AND CORRECTION OF NON-RED EYE FLASH DEFECTS

(75) Inventors: Mihai Ciuc, Bucharest (RO); Florin Nanu, Bucharest (RO); Stefan Petrescu, Bucharest (RO); Adrian Capata, Bucharest (RO); Constantin Vertan, Bucharest (RO); Peter Corcoran, Claregalway (IE); Petronel Bigioi, Galway (IE); Eran Steinberg, San Francisco, CA (US)

(73) Assignee: FotoNation Vision Limited, Galway (IE)

( * ) Notice: Subject to any disclaimer, the term of this patent is extended or adjusted under 35 U.S.C. 154(b) by 79 days.

(21) Appl. No.: 11/674,633

(22) Filed: Feb. 13, 2007

(65) Prior Publication Data

US 2007/0189606 A1 Aug. 16, 2007

Related U.S. Application Data

(60) Provisional application No. 60/773,714, filed on Feb. 14, 2006.

(51) Int. Cl.
*G06K 9/00* (2006.01)
(52) U.S. Cl. ..................... 382/167; 382/275
(58) Field of Classification Search ............ None
See application file for complete search history.

(56) References Cited

U.S. PATENT DOCUMENTS

| | | | |
|---|---|---|---|
| 4,577,219 A | 3/1986 | Klie et al. | |
| 4,646,134 A | 2/1987 | Komatsu et al. | |
| 4,881,067 A | 11/1989 | Watanabe et al. | |
| 5,455,606 A | 10/1995 | Keeling et al. | |
| 5,671,013 A | 9/1997 | Nakao | |
| 6,195,127 B1 | 2/2001 | Sugimoto | |
| 6,614,471 B1 | 9/2003 | Ott | |
| 6,628,833 B1 | 9/2003 | Horie | |
| 6,798,913 B2 | 9/2004 | Toriyama | |

(Continued)

FOREIGN PATENT DOCUMENTS

EP 0979487 1/1998

(Continued)

OTHER PUBLICATIONS

Combier, Nathalie; Dauty, Isabelle; Lemoine, Jacques, "Removal of Defects on Flash Radiographic Images by Fuzzy Combination", Conference: Machine Vision Applications in Industrial Inspection III, San Jose, CA, USA, (Sponsor: SPIE International Society for Opt Engineering, Bellingham, WA USA), Proceedings of SPIE—The International Society for Optical Engineering v 2423 1995. Society of Photo-Optical Instrumentation, Bellingham, WA, USA. p. 301-312, 1995, http://rlinks2.dialog.com/NASApp/ChannelWEB/DialogProServlet?ChName=engineerin.

(Continued)

*Primary Examiner*—Vikkram Bali
(74) *Attorney, Agent, or Firm*—Jackson & Co., LLP; Andrew V. Smith

(57) ABSTRACT

A technique for detecting large and small non-red eye flash defects in an image is disclosed. The method comprises selecting pixels of the image which have a luminance above a threshold value and labeling neighboring selected pixels as luminous regions. A number of geometrical filters are applied to the luminous regions to remove false candidate luminous regions.

20 Claims, 4 Drawing Sheets

U.S. PATENT DOCUMENTS

| | | | |
|---|---|---|---|
| 2001/0052937 | A1 | 12/2001 | Susuki |
| 2002/0114513 | A1* | 8/2002 | Hirao .................... 382/167 |
| 2002/0136450 | A1 | 9/2002 | Chen et al. |
| 2003/0137597 | A1 | 7/2003 | Sakamoto et al. |
| 2003/0194143 | A1 | 10/2003 | Iida |
| 2004/0184670 | A1 | 9/2004 | Jarman et al. |
| 2004/0239779 | A1 | 12/2004 | Washisu |
| 2004/0240747 | A1 | 12/2004 | Jarman et al. |
| 2005/0047655 | A1 | 3/2005 | Luo et al. |
| 2005/0047656 | A1 | 3/2005 | Luo et al. |
| 2005/0074179 | A1 | 4/2005 | Wilensky |
| 2005/0238230 | A1* | 10/2005 | Yoshida .................. 382/167 |
| 2006/0038916 | A1 | 2/2006 | Knoedgen et al. |
| 2006/0203108 | A1 | 9/2006 | Steinberg et al. |
| 2007/0116379 | A1* | 5/2007 | Corcoran et al. .......... 382/275 |
| 2007/0116380 | A1* | 5/2007 | Ciuc et al. ................ 382/275 |

FOREIGN PATENT DOCUMENTS

| | | | |
|---|---|---|---|
| JP | 09-214839 | | 8/1997 |
| JP | 2002247596 | * | 8/2002 |
| WO | WO 99/33684 A2 | | 7/1999 |
| WO | WO 2004/034696 A1 | | 4/2004 |

OTHER PUBLICATIONS

Cucchiara, R. Piccardi, M., "Detection of Luminosity Profiles of Elongated Shapes", Ferrara Univ., Italy; International Conference on Image Processing, 1996.Proceedings, Publication Date: Sep. 16-19, 1996, vol. 3, pp. 635-638 vol. 3, DOI: 10.1109/ICIP.1996.560575Posted online: Aug. 6, 2002 20:44:17.0 http://ieeexplore.ieee.org/search/freesrchabstract.jsp?arnumber=560575&isnumber=12210&punumber=4140&k2dockey=560575@ieeecnfs&query=%28%28images+and+defects+and+luminance%29%29+-%3Cin%3E+metadata&pos=2   >http://ieeexplore.ieee.org/search/freesrchabstract.jsp?arnumber=560575&isnumber=12210&punumber=4140&k2dockey=560575@ieeecnfs&query=%28%28images+and+defects+and+luminance%29%-29+%3Cin%3E+metadata&pos=2>.

Han, T., Goodenough, D.G., Dyk, A., Love, J., "Detection and Correction of abnormal Pixels In Hyperion Images", 2002 IEEE International Symposium on Geoscience and Remote Sensing, Jun. 24-28, 2002, vol. 3, pp. 1327-1330 vol. 3, DOI: 10.1109/ IGARSS.2002.1026105, Posted online: 2002-11-0717:05:47.0 correction, atmospheric correction, and further analysis. http://ieeexplore.ieee.org/search/freesrchabstract.jsp?arnumber=1026105&isnumber=22038&punumber=7969&k2dockey=1026105@ieeecnfs&query=%28images+and+correction+and+pixels+29+%3Cin%-3E+metadata&pos=3.

Iivarinen, J., and J Pakkenen, "Content-Based Retrieval of Defect Images", Proceedings of Advanced Concepts for Intelligent Vision, Laboratory of Computer Information Science. http://www.cs.tut.fi/~avisa/digger/Publications/acivs02.pdf, 2002.

Ito, M., "an Automated System for LSI Fine Pattern Inspection Based on Comparison of Sem Images and Cad Data", IEEE International Conference on Robotics and Automation, 1995. Proceedings, Publication Date: May 21-27, 1995, vol. 1,pp. 544-549 vol. 1 DOI: 10.1109/ROBOT.1995.525340, Posted online:Aug. 6, 2002 20:08:01.0 http://ieeexplore.ieee.org/search/freesrchabstract.jsp?arnumber=525340&isnumber=11429&punumber=3951&k2dockey=525340@ieeecnfs&query=%28%28%28%28images+and+defects+and+correction%-29%29%29%29+%3Cin%3E+metadata&pos+3.

Plotnikov, Yuri, and William P. Winfree, "Advanced Image Processing for Defect Visualization in Infrared Thermography" (1998), NASA Langley Research Center, M.S. Posted: ACM Portal, http://citeseer.ist.psu.edu/plotnikov98advanced.html.

Jin, B., Park, N. George, K.M., Yeary, M.B., "Modeling and Analysis of Soft-Test/Repair for CCD-Based Digital X-Ray Systems", Instrumentation and Measurement, IEEE Transactions on, Dec. 2003, vol. 52, Issue: 6, pp. 17131721, ISSN: 0018-9456, Digital Object Identifier: 10.1109/TIM.2003.818735, Posted online: Nov. 24, 2003 09:36:26.0 http://ieeexplore.ieee.org/search/freesrchabstract.jsp?arnumber=1246541&isnumber=27936&punumber=19&k2dockey=1246541@ieeejrns&query=%28%28images+and+defects+and+flash%29%29+%3C-in%3E+metadata&pos=0<http://ieeexplore.ieee.org/search/freesrchabstract.jsp?arnumber=1246541&isnumber=27936&punumber=19&k2dockey=1246541@ieeejrns&query=%28%28images+and+defects+and+flash%29%29+-%3Cin%3E+metadata&pos=0>.

Plotnikov, Yuri and William P. Winfree, "Visualization of Subsurface Defects in Composites Using a Focal Plane Array Infrared Camera" (1999), NASA Langley Research Center, http://citeseer.ist.psu.edu/357066.html.

Toet, A., "Multiscale Color Image Enhancement", International Conference on Image Processing and its Applications, 1992., Publication Date: Apr. 7-9, 1992,pp. 583 585, Meeting Date: Apr. 7, 1992-Apr. 9, 1992Posted online: Aug. 6, 2002 18:09:24.0 http://ieeexplore.ieee.org/search/freesrchabstract.jsp?arnumber=146865&isnumber=3917&punumber=1197&k2dockey=146865@ieeecnfs&query=%28%28images+and+defects+and+luminance%29%29+-%3Cin%3E+metadata&pos=1.

Yap-Peng, Tan Acharya, T.A, "Robust Sequential Approach for the Detection of Defective Pixels in an Image Sensor", 1999, IEEE International Conference on Acoustics, Speech, and Signal Processing, 1999. ICASSP '99. Proceedings, Mar. 15-19, 1999, vol. 4, pp. 2239 2242, DOI: 10.1109/ICASSP.1999.758382, http://ieeexplore.ieee.org/search/freerchabstract.jsp?arnumber=758382&isnumber=16342&punumber=6110&k2dockey=758382@ieeecnfs&query=%28%28%28%28images+and+defects+and+correction%-29%29%29%29+%3Cin%3E+metadata&pos=5.

* cited by examiner

AUTOMATIC DETECTION AND CORRECTION OF NON-RED EYE FLASH DEFECTS

PRIORITY

This application claims the benefit of priority under 35 USC §119 to U.S. provisional patent application No. 60/773,714, filed Feb. 14, 2006.

BACKGROUND

1. Field of the Invention

The present invention relates to a system and method for automatically detecting and correcting non red-eye flash defects in an image, and in particular, white-eye flash defects.

2. Description of the Related Art

Published PCT patent application no. WO 03/071484 A1 to Pixology, discloses a variety of techniques for red-eye detection and correction in digital images. In particular, Pixology discloses detecting "glint" of a red-eye defect and then analyzing the surrounding region to determine the full extent of the eye defect.

U.S. Pat. No. 6,873,743 to Steinberg discloses a similar technique where initial image segmentation is based on both a red chrominance component and a luminance component.

White-eye defects (white eyes) do not present the red hue of the more common red eye defects. White eye occurs more rarely but under the same conditions as red eye, i.e. pictures taken with a flash in poor illumination conditions. In some cases, white eyes appear slightly golden by acquiring a yellowish hue.

There are two main types of white-eye, small and large. Small white eyes, as illustrated at reference 10 in FIG. 1, appear on far distant subjects. They resemble luminous dots and information in their neighborhood about other facial features is poor and therefore unreliable. Large white eyes 20 as illustrated in FIG. 2, are very well defined and one can rely on information around them. In general, a white eye is large if it occupies a region including more than 150 pixels (for a 1600×1200 pixel image).

It is desired to have a technique for detecting and/or correcting white eye defects.

SUMMARY OF THE INVENTION

A method is provided for detecting non-red eye flash defects in an image. One or more luminous regions are defined in said image. Each region has at least one pixel having luminance above a luminance threshold value and a redness below a red threshold value. At least one filter is applied to a region corresponding to each luminous region. The roundness of a region corresponding to each luminous region is calculated. In accordance with the filtering and the roundness, it is determined whether the region corresponds to a non-red eye flash defect.

The defining may include selecting pixels of the image which have a luminance above a luminance threshold value and a redness below a red threshold value, and grouping neighboring selected pixels into the one or more luminous regions.

The method may further include correcting the non-red eye flash defect. One or more pixels of a detected defect region may be darkened. It may be determined not to darken pixels within a detected defect region having an intensity value greater than a threshold. The correcting, for each pixel of a detected defect region, may include setting its intensity value to an intensity value substantially equal to an average of the intensity values of pixels on a boundary of the defect region. An averaging filter may be applied to the region after the correcting.

The at least one filter may include any of a size filter for determining if said region is greater than a size expected for said non-red flash defect, a filter for adding pixels to a luminous region located with the luminous region and which have luminance below the luminance threshold value or a redness above the red threshold value, a skin filter for determining if the region is located within a region of an image characteristic of skin, or a face filter for determining if the region is located within a region of an image characteristic of a face, or any combination thereof.

The roundness calculation may be performed by a filter to determine if the region is a non-red eye flash defect.

For each luminous region, a corresponding aggregated region may be determined by determining a seed pixel for the aggregated region within a luminous region, and iteratively adding non-valley neighbouring pixels to the aggregated region until no non-valley neighboring pixels adjacent to the aggregated region remain. The region corresponding to each luminous region may be the aggregated region corresponding to the luminous region. Contrast may be calculated for an aggregated region by computing a ratio of the average intensity values of pixels on a boundary of said aggregated region to the intensity value of the seed pixel. It may be determined whether each aggregated region has a yellowness above a yellow threshold value. An average saturation may be calculated for each aggregated region and it may be determined whether the saturation exceeds a threshold value.

The at least one filter may be applied to the luminous region. An intensity gradient may be calculated for each luminous region. A Hough transform may be performed on each intensity gradient. A most representative circle on each transformed region may be determined, and each circle verified.

A digital image processing device is also provided that is operable to detect non-red eye flash defects in an image, and which includes a controller that is arranged to define one or more luminous regions in the image. Each region has at least one pixel with a luminance above a luminance threshold value and a redness below a red threshold value. At least one filter is applied to a region corresponding to each luminous region. The roundness of a region corresponding to each luminous region is calculated. In accordance with the filtering and the roundness, it is determined whether the region corresponds to a non-red eye flash defect.

The device may be a digital camera or camera phone, a general purpose, portable or hand-held computer, a printer or a digital scanner, or any combination thereof.

A further method is provided for correcting a white eye defect in a digital image. The method includes acquiring a digital image, and determining a luminance of pixels within the digital image. Those pixels having a luminance above a certain threshold are selected as candidate regions for correction of a white eye defect. The selected pixels are filtered, and white eye defect is corrected for non-filtered pixels among the candidate regions.

The filtering may include geometrical filtering of pixels based on a size or shape or both of a selected pixel region. A selected pixel region may be above a threshold size, for example. Skin tone or human face filtering of pixels may be based on neighboring pixels to a selected pixel region not having a skin tone or other human face characteristic.

Roundness may be calculated for a selected pixel region, which may be corrected if the roundness does not exceed a certain threshold value of roundness.

The correcting may include calculating a contrast of a selected pixel region, which may be corrected if it does not exceed a certain threshold value of contrast.

The filtering may include checking whether an average saturation of a selected pixel region exceeds a certain threshold saturation, and correcting the selected pixel region only if the threshold is exceeded.

A bright pixel may be selected as a seed pixel. A candidate region may be determined by aggregating outwardly from the seed pixel to combine those pixels that are not valley points with the seed pixel as an aggregated region until a minimum number of non-valley neighbors are left or a threshold size is reached, or a combination thereof. The minimum number may be zero. Intensities of points in the aggregated region may be set to an average intensity of valley points delimiting the region. The aggregated region may be smoothed.

The filtering may include determining and analyzing edges of candidate regions. An intensity gradient may be computed for one or more candidate regions. The one or more candidate regions having intensity gradient computed may be limited to include only candidate regions having a minimum size. A Hough transformation may be performed on the intensity gradient image corresponding to each candidate region. Candidate circles produced by the Hough transformation may be determined, and the candidate region may be filtered and not corrected when the seed pixel is not included in the candidate circle or the average gradient along the circle is below a threshold, or both.

A candidate region that is merely a glint may be filtered.

The method may also include detecting and correcting a red eye defect within the digital image.

One or more digital storage devices are also provided having executable program code embodied therein for programming one or more processors to perform a method as described herein.

BRIEF DESCRIPTION OF THE DRAWINGS

Embodiments will now be described, by way of example, with reference to the accompanying drawings, in which.

DETAILED DESCRIPTION OF THE EMBODIMENTS

Figure 1A:
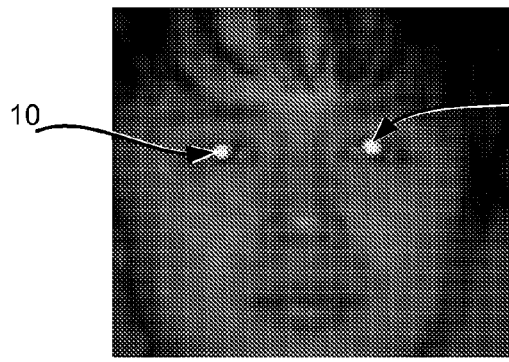
FIGS. 1(a) and (1b) (hereinafter "FIG. 1") illustrate an image with small white-eye defects.
Figure 1B:
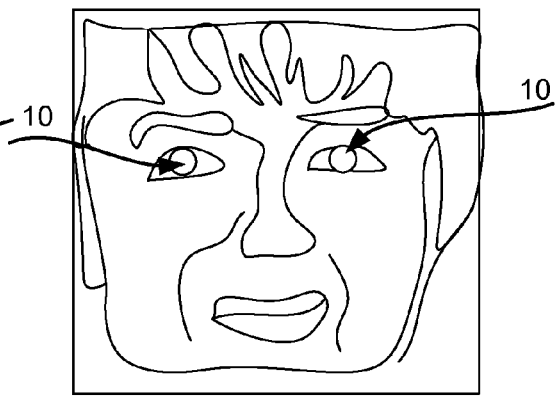
Figure 2A:
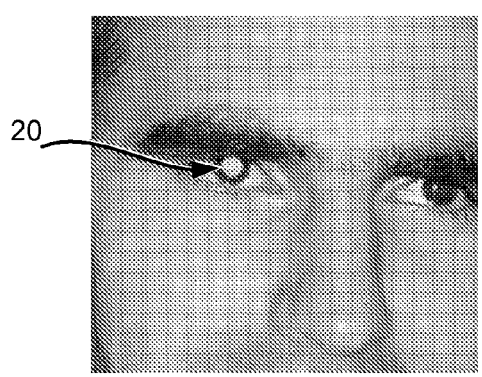
FIGS. 2(a) and (2b) (hereinafter "FIG. 2") illustrate an image with a large white-eye defect.
Figure 2B:
Figure 3:
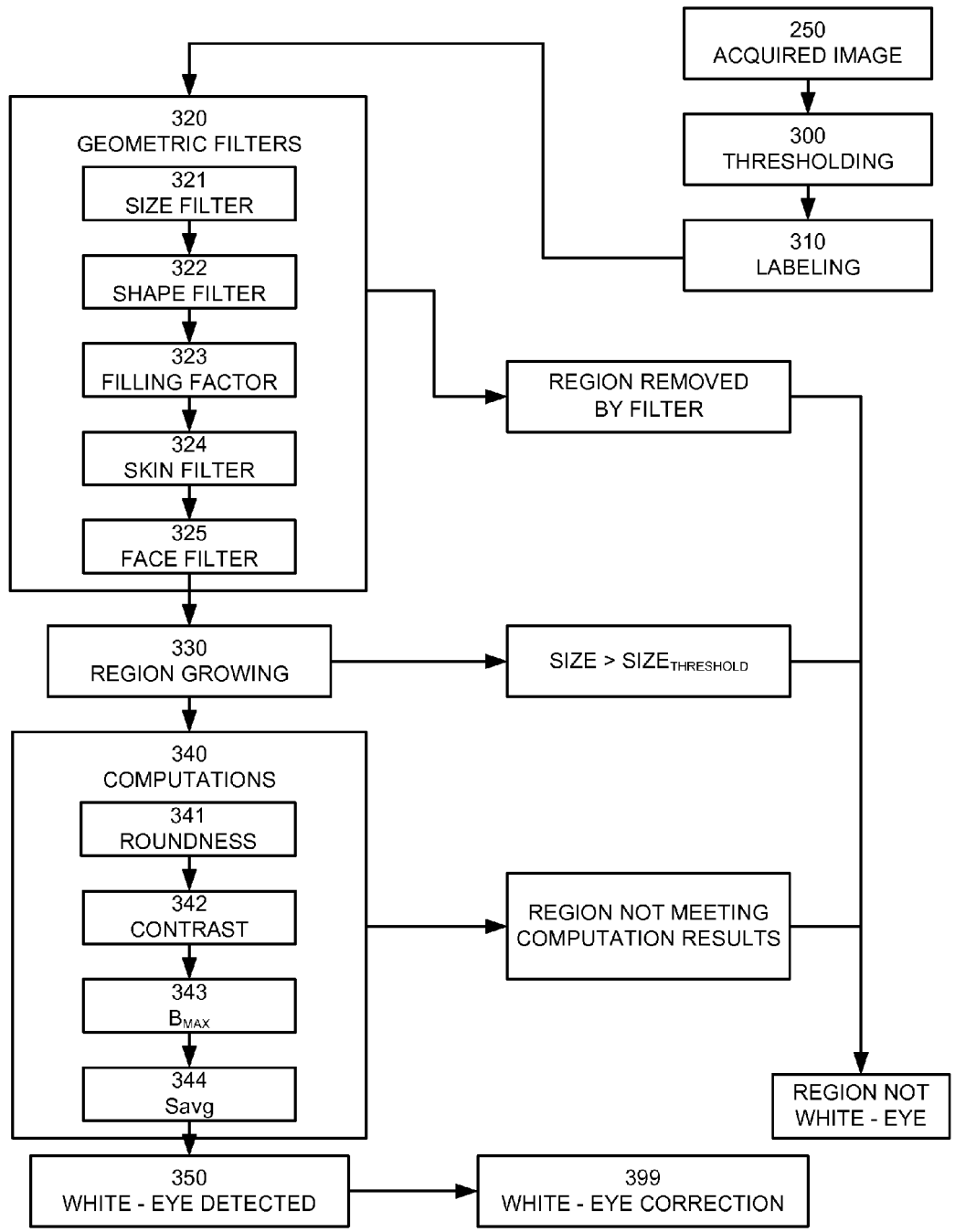
FIG. 3 depicts a flow diagram of the automatic detection and correction of small white-eye defects.

A method is provided for automatic detection and correction of small white eyes. A flowchart illustrating one embodiment is shown in FIG. 3. In this embodiment, an eye defect is said to be white or golden if it is bright, for example, in Lab color space the local average luminance I is higher than 100, and is not too saturated, for example, in Lab color space, the absolute value of a and b parameters does not exceed 15.

Initially, the luminance of each pixel of an acquired image 250 to be corrected is determined and a selection of all the pixels whose luminance is larger than a threshold value is made, 300. In the preferred embodiment, the acquired image is in RGB space and the intensity is calculated as I=max[R, G] and the intensity threshold value is 220. Also, to avoid highly-saturated colors (such as pure red or pure green) the saturation computed as abs(R−G) is compared to a threshold of 35, and discarded if higher. As such, only high-luminance pixels are retained, which provide seeds for a future region growing procedure.

In alternative implementations, the formula for luminance can be taken as the Y value for an image in YCbCr space. However it will be appreciated that luminance can be taken as the L value for an image in CIE-Lab space or indeed any other suitable measure can be employed.

The selected pixels are then labeled 310. This involves identifying selected pixels neighboring other selected pixels and labeling them as luminous regions of connected selected pixels.

These luminous regions are then subjected to a plurality of geometrical filters 320 in order to remove luminous regions, which are not suitable candidates for white eyes.

In the preferred embodiment, the regions first pass through a size filter 321 for removing regions whose size is greater than an upper limit. The upper limit is dependent on the size of the image, and in an embodiment, the upper limit is 100 pixels for a 2 megapixel image.

Filtered regions then pass through a shape filter 322, which removes all suitably sized luminous regions, which are not deemed round enough. The roundness of the luminous regions is assessed by comparing the ratio of the two variances along the two principal axes with a given threshold. Regions such as those comprising less than approximately 5-10 pixels, are exempt from passing through the shape filter, as for such small regions, shape is irrelevant.

Filling factor 323 is a process that removes empty regions bounded by the luminous regions if certain criteria are met. In the preferred embodiment, the ratio of the area of luminous region to the area of the bounded empty region is determined and if this ratio is below a certain threshold, for example, 0.5 in one embodiment, the luminous region is removed.

The remaining luminous regions are finally passed through a skin filter 324 and a face filter, 325 to prevent white spots being mis-detected as white eyes based on the fact that they neighbor something that is not characteristic of the human face or skin color.

Skin around white-eye tends to be under-illuminated and turn slightly reddish. A wide palette of skin prototypes is maintained for comparison with the pixels of the luminous regions. For each luminous region, the ratio of pixels, characteristic to the human skin, to pixels, which are not characteristic to the human skin, in a bounding box, is computed and compared to a threshold value. In the preferred embodiment, the threshold is quite restrictive at 85-90%.

Similarly, a wide palette of possible face colors is maintained for comparison with the pixels of the luminous regions. For each luminous region, the ratio of pixels, characteristic to the human face, to pixels, which are not characteristic to the human face, in a bounding box, is computed and compared to a threshold value. In the preferred embodiment, the threshold is quite restrictive at 85-90%. If the imposed percentage is met or exceeded, the region proceeds to the step of region growing, 330.

Region growing 330 begins by selecting the brightest pixel of each successfully filtered luminous region as a seed. Each neighbor of the seed is examined to determine whether or not it is a valley point. A valley point is a pixel that has at least two neighboring pixels with higher intensity values, located on both sides of the given pixel in one of its four main directions (horizontal, vertical and its two diagonals). As illustrated below in table 1, the central pixel with intensity 99 is a valley point because it has two neighbors in a given direction that both have greater intensity values. Table 2 illustrates a central pixel, 99, which is not a valley point because there is no saddle configuration on one of the four main directions.

TABLE 1

| 100 | 98 | 103 |
|---|---|---|
| 70 | 99 | 104 |
| 104 | 105 | 98 |

TABLE 2

| 100 | 98 | 103 |
|---|---|---|
| 70 | 99 | 104 |
| 98 | 105 | 98 |

Starting from the seed, an aggregation process examines the seed pixel's neighbors and adds these to the aggregated region provided that they are not valley points. This examination and aggregation process continues until there are no non-valley neighbors left unchecked or until a maximum threshold size is reached. If a maximum threshold size is reached, the region is deemed not to be a white eye and no further testing is carried out on this region.

The outcome of this stage is a number of aggregated regions, which have been grown from the brightest points of each previously defined and filtered luminous region, and aggregated according to the valley point algorithm. It will be seem however that in alternative implementations, aggregation could take place before filtering and so the filters 320 could be applied to aggregated regions rather than luminous regions.

A number of computations are then carried out on these aggregated regions 340.

The roundness of the aggregated region is calculated 341 as R=perimeter2/(4.π.Area), where R≧1. R=1 for the perfect circle, and thus the larger the R value, the more elongated the shape. White-eyes should be round and so must be characterized by a value of R that does not exceed a certain threshold value. In the preferred embodiment, the threshold value for R is a function of eye's size. Thus we expect an eye to be rounder as its size increases (the smaller the eye, the poorer the approximation of its shape by a circle, and the less accurate the circle representation in the discrete plane). Three thresholds are used in the preferred embodiment (for a 2 megapixel image—these will scale linearly for larger/smaller image sizes):

R=1.1 for large eye (i.e., size between 65 and 100 pixels—for a 2 megapixel image);

R=1.3 for medium-sized eye (size between 25 and 65 pixels); and

R=1.42 for small eyes (size less than 25 pixels).

The contrast of the aggregated regions is then computed 342 as the ratio of the average intensity of the valley points delimiting the aggregated region to the maximum intensity value inside the region, i.e. the intensity of the brightest seed point from step 330. As small white eyes occur normally in low illumination conditions, the contrast should be high.

Most of the small white-eyes have a yellowish hue meaning that they have at least some pixels characterized by high values of the b component in Lab space. Therefore the maximum value of b, bmax, is a good discriminator between actual white-eyes and for instance, eye glints or other point-like luminous reflections.

In one embodiment, the pixels being processed are in RGB color space. In order to obtain a value for the b component, the aggregated regions are transformed from RGB color space to Lab color space.

The maximum value of the b component, $b_{max}$, in Lab colour space is then calculated and compared with a threshold, $b_{threshold}$, at 343. If $b_{max} \geq b_{threshold}$, the average saturation in the region is then computed at 344. Otherwise, the aggregated region is deemed not to be white-eye.

The average saturation in the aggregated region is computed as: $S=\sqrt{(a2+b2)}$ 344. White-eyes are more colored than other regions and as such the region's average saturation must exceed a threshold in order for a candidate region to be declared white-eye at 350. Aggregated regions passing the tests outlined above are labeled white-eyes and undergo a correction procedure 399 according to the preferred embodiment for the present invention.

The correction procedure comprises setting the intensity I in LAB space, of the aggregated region's points to the average intensity of the valley points delimiting the region as used in the contrast calculation at 342. In the preferred embodiment, the whole aggregated region is then smoothed by applying a 3×3 averaging filter.

Figure 4:
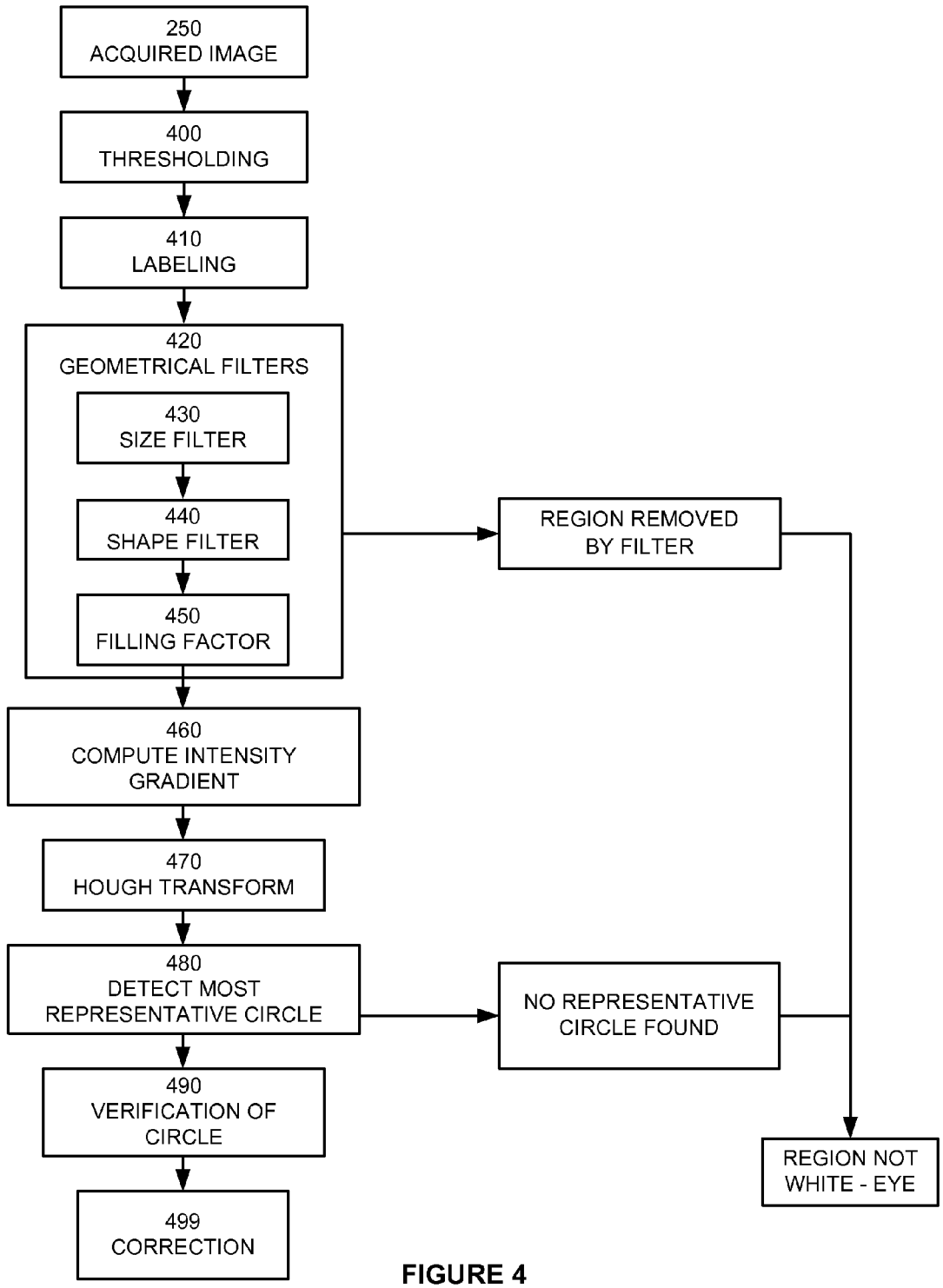
FIG. 4 depicts a flow diagram of the automatic detection and correction of large white-eye defects.

According to a further embodiment, there is provided a method for automatic detection and correction of large white eyes, as depicted in the flowchart of FIG. 4. The main characteristics of large white eyes is that by being very well defined, their shape is round and they are well separated from the iris.

Referring to FIG. 4, it can be seen that the first five stages of the large white-eye automatic detection process, thresholding 400, labeling, 410, size filter 430, shape filter 440 and filling factor 450, are identical to those of the small white-eye automatic detection process as described above. However, it will be seen that the threshold applied in the size filter 430 will be larger than for the step 322 and that different parameters may also be required for the other stages.

Nonetheless, once the luminous regions have passed through the geometrical filters 420, the next steps determine and analyze the edges of the suspected large white-eyes.

Figure 5A:
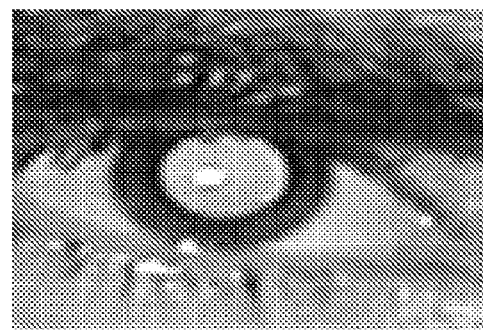
FIG. 5(a) illustrates a grey-level version of an image to be corrected.
Figure 5B:
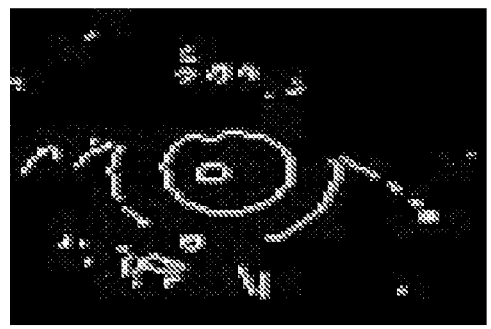
FIG. 5(b) illustrates an edge-image of the image of FIG. 5(a) carried out using a Sobel gradient.
Figure 5C:
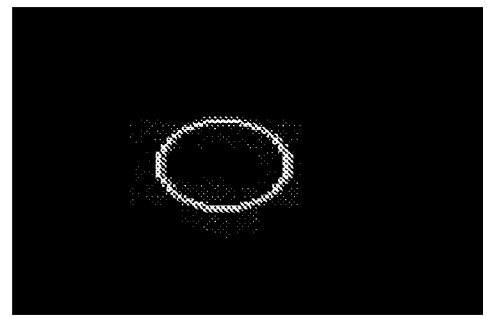
FIG. 5(c) illustrates a most representative circle of the image of FIG. 5(b) as produced using the Hough Transform.

First, an intensity gradient of each luminous region is computed 460. The gradient is calculated from a grey-scale version of each luminous region as depicted in FIG. 5(*a*). Gradient is any function that has a high response at points where image variations are great. Conversely, the response of the gradient is low in uniform areas. In the preferred embodiment, the gradient is computed by linear filtering with two kernels, one for the horizontal gradient, Gx, and one for the vertical gradient, Gy. The modulus of the gradient is then computed as G=sqrt(Gx2+Gy2) and is further thresholded to obtain edge points and produce a binary edge-image as depicted in FIG. 5(*b*). In the preferred embodiment, step 460 is carried out using a simple Sobel gradient. However it will be appreciated that any gradient function such as Prewitt or Canny may be used.

Once the edges of the suspected large white-eye regions have been determined, a Hough Transform is performed on each gradient image, 470. A Hough Transform detects shapes that can be parameterized, for example, lines, circles, ellipses etc and is applied to binary images, usually computed as edge maps from intensity images. The Hough Transform is based on an alternative space to that of the image, called accumulator space. Each point (x,y) in the original image contributes to all points in the accumulator space, in this case, corresponding to the possible circles that may be formed to contain the (x,y) point. Thus, all points corresponding to an existing circle in the original edge-image will all contribute to that point in the accumulator space corresponding to that particular circle.

Next, the most representative circle as produced by the Hough Transform must be detected for each region, 480. This step comprises inspecting the points in the Hough accumulator space, which have a significant value. This value is dependent on the number of points in the original edge image, which contribute to each point in the accumulator space. If no representative circle is found, there is deemed to be no large white eye present in that region of the image.

However, if a high value point is found, then the corresponding circle in the original image is checked and a verification of the circle 490 is carried out.

This involves checking for example whether the most representative circle encircles the original seed point for the luminous region and/or whether the average gradient along the circle exceeds a threshold.

If a circle of a luminous region is verified, the region is corrected, 499, by darkening the pixels in the interior of the circle. In the preferred embodiment, the intensity of the pixels is set to 50 and an averaging filter is applied.

Preferably, however, the correction also takes into account the possibility of the luminous region including a glint, which should not be darkened. In RGB space, glint candidates are selected as high luminance pixels (min(R, G)>=220 and max(R, G)==255). If a very round (both in aspect ratio and elongation), luminous, and desaturated region is found within the interior of a luminous region, its pixels are removed from the luminous region pixels to be corrected.

In the case where further eye-color information is available, for example in the case where person-recognition procedures are available with a database of previously captured images, the additional color information stored with that person's information in the database can be advantageously incorporated into the correction of both large and small white-eye.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components. The following references are also incorporated by reference:

U.S. patent application Ser. Nos. 11/462,035,11/282,955, and

United States published patent applications nos. 2002/0136450, 2005/0047655, 2004/0184670, 2004/0240747, 2005/0047656, 2005/0041121, 2005-0140801, 2005-0031224; and U.S. Pat. No. 6,407,777.

The present invention is not limited to the embodiments described herein, which may be amended or modified without departing from the scope of the present invention.

What is claimed is:

1. A method for detecting non-red eye flash defects in an image, said method comprising:
   (a) defining one or more luminous regions in said image, each region having at least one pixel having luminance above a luminance threshold value and a measure of redness below a red threshold value;
   (b) applying at least one filter to a region corresponding to each luminous region;
   (c) calculating the roundness of a region corresponding to each luminous region; and
   (d) in accordance with said filtering and said roundness, determining whether said region corresponds to a non-red eye flash defect.

2. A method according to claim 1, wherein said defining comprises:
   (i) selecting pixels of the image which have a luminance above a luminance threshold value and a redness below a red threshold value; and
   (ii) grouping neighboring selected pixels into said one or more luminous regions.

3. The method according to claim 1, further comprising correcting said non-red eye flash defect.

4. The method according to claim 1, wherein said at least one filter comprises
   (i) a size filter for determining if said region is greater than a size expected for said non-red flash defect;
   (ii) a filter for adding pixels to a luminous region located with said luminous region and which have luminance below said luminance threshold value or a redness above said red threshold value;
   (iii) a skin filter for determining if said region is located within a region of an image characteristic of skin; or
   (iv) a face filter for determining if said region is located within a region of an image characteristic of a face, or combinations thereof.

5. The method of claim 1, wherein calculating said roundness is performed by said at least one filter to determine if said region is a non-red flash defect.

6. The method according claim 1, further comprising, for each luminous region, determining a corresponding aggregated region by:
   (i) determining a seed pixel for said aggregated region within a luminous region; and
   (ii) iteratively adding non-valley neighbouring pixels to said aggregated region until no non-valley neighboring pixels adjacent to said aggregated region remain.

7. The method according to claim 1, further comprising applying said at least one filter to said luminous region.

8. The method according to claim 1, further comprising calculating an intensity gradient of each luminous region.

9. A digital image processing device operable to detect non-red flash eye defects in an image, and comprising a controller arranged to:
   (a) define one or more luminous regions in said image, each region having at least one pixel having luminance above a luminance threshold value and a measure of redness below a red threshold value;

(b) apply at least one filter to a region corresponding to each luminous region;

(c) calculate the roundness of a region corresponding to each luminous region; and (d) in accordance with said filtering and said roundness, determine whether said region corresponds to a non-red flash eye defect.

10. A device according to claim 9, comprising: a digital camera or camera phone, a general purpose, portable or hand-held computer, a printer or a digital scanner, or combinations thereof.

11. One or more digital storage devices having executable program code embodied thereon for programming one or more processors to perform a method of correcting a white eye defect in a digital image, the method comprising:

(a) acquiring a digital image;

(b) determining a luminance of pixels within the digital image;

(c) selecting those pixels having a luminance above a certain threshold as candidate regions for correction of a white eye defect; defining one or more luminous regions in said image, each region having at least one pixel having luminance above a luminance threshold value and a measure of redness below a red threshold value;

(d) filtering the selected pixels; and (e) correcting the white eye defect for non-filtered pixels among the selected pixels.

12. The one or more storage devices of claim 11, wherein the filtering comprises geometrical filtering of pixels based on a size or shape or both of a selected pixel region.

13. The one or more storage devices of claim 11, wherein the filtering comprises geometrical filtering of pixels based on a size of a selected pixel region being above a threshold size.

14. The one or more storage devices of claim 11, wherein the correcting comprising calculating a roundness of a selected pixel region, and correcting the roundness if it does not exceed a certain threshold value of roundness.

15. The one or more storage devices of claim 11, wherein the filtering comprises checking whether an average saturation of a selected pixel region exceeds a certain threshold saturation, and correcting the selected pixel region only if the threshold is exceeded.

16. The one or more storage devices of claim 11, the method further comprising:

(i) selecting a bright pixel as a seed pixel; and (ii) aggregating outwardly from the seed pixel to combine those pixels that are not valley points with the seed pixel as an aggregated region until a minimum number of non-valley neighbors are left or a threshold size is reached, or a combination thereof.

17. The one or more storage devices of claim 16, the method further comprising smoothing the aggregated region.

18. The one or more storage devices of claim 16, the method further comprising computing an intensity gradient for one or more candidate regions.

19. The one or more storage devices of claim 11, the method further comprising filtering a candidate region that comprises merely a glint.

20. The one or more storage devices of claim 11, the method further comprising detecting and correcting a red eye defect within the digital image.

* * * * *